(12) United States Patent
Lal et al.

(10) Patent No.: US 10,171,500 B2
(45) Date of Patent: Jan. 1, 2019

(54) SYSTEMS, APPARATUSES, AND METHODS FOR ENFORCING SECURITY ON A PLATFORM

(71) Applicants: Reshma Lal, Hillsboro, OR (US); Bin Cedric Xing, Hillsboro, OR (US)

(72) Inventors: Reshma Lal, Hillsboro, OR (US); Bin Cedric Xing, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/730,465

(22) Filed: Dec. 28, 2012

(65) Prior Publication Data
US 2015/0264087 A1    Sep. 17, 2015

(51) Int. Cl.
  H04L 29/06    (2006.01)
  H04L 29/08    (2006.01)

(52) U.S. Cl.
  CPC ............. H04L 63/20 (2013.01); H04L 63/08 (2013.01); H04L 67/145 (2013.01); H04L 63/1408 (2013.01)

(58) Field of Classification Search
  None
  See application file for complete search history.

(56) References Cited

U.S. PATENT DOCUMENTS

| | | | | |
|---|---|---|---|---|
| 6,606,304 B1* | 8/2003 | Grinter | ................... | G06Q 10/10 340/573.4 |
| 7,617,541 B2* | 11/2009 | Plotkin | ................... | G06F 21/62 707/999.009 |
| 7,650,638 B1* | 1/2010 | Njemanze | ........... | H04L 63/1408 713/170 |
| 8,863,278 B2* | 10/2014 | Chitor | ................... | G06F 21/55 370/389 |
| 2003/0229808 A1* | 12/2003 | Heintz | ................ | H04L 63/0272 726/23 |
| 2006/0005048 A1* | 1/2006 | Osaki | ................... | G06F 11/1464 713/193 |
| 2007/0005957 A1* | 1/2007 | Sahita | ................... | G06F 21/554 713/156 |
| 2007/0006307 A1* | 1/2007 | Hahn | ................... | G06F 21/556 726/22 |
| 2007/0143462 A1* | 6/2007 | Venkatachalam | ..... | G06F 21/554 709/223 |
| 2007/0199061 A1* | 8/2007 | Byres | ................... | H04L 41/0806 726/11 |
| 2008/0005798 A1* | 1/2008 | Ross | ....................... | G06F 21/33 726/26 |
| 2008/0244747 A1* | 10/2008 | Gleichauf | ........... | G06F 11/1415 726/25 |
| 2010/0064341 A1* | 3/2010 | Aldera | ................... | H04L 63/102 726/1 |

(Continued)

*Primary Examiner* — Trang T Doan
(74) *Attorney, Agent, or Firm* — Womblel Bond Dickinson (US) LLP

(57) ABSTRACT

Embodiments of a system, apparatus, and method of platform security are describe. In some embodiments, a system comprises a manageability engine to detect if a software agent of the platform is removed and a software agent enclave, wherein the software agent enclave and manageability engine each include a specific session key to be used for communications between the software agent enclave and the manageability engine.

14 Claims, 11 Drawing Sheets

(56) References Cited

U.S. PATENT DOCUMENTS

| | | | |
|---|---|---|---|
| 2011/0065419 A1* | 3/2011 | Book | G06F 21/305 |
| | | | 455/411 |
| 2011/0076986 A1* | 3/2011 | Glendinning | G06F 21/88 |
| | | | 455/411 |
| 2011/0131645 A1* | 6/2011 | Johnson | G06F 11/0709 |
| | | | 726/12 |
| 2011/0167472 A1* | 7/2011 | Evans | H04W 4/003 |
| | | | 726/1 |
| 2012/0070002 A1* | 3/2012 | Smith | H04L 9/085 |
| | | | 380/277 |
| 2012/0222113 A1* | 8/2012 | Keohane | H04L 63/1466 |
| | | | 726/22 |
| 2013/0239214 A1* | 9/2013 | Klein | G06F 21/566 |
| | | | 726/24 |

\* cited by examiner

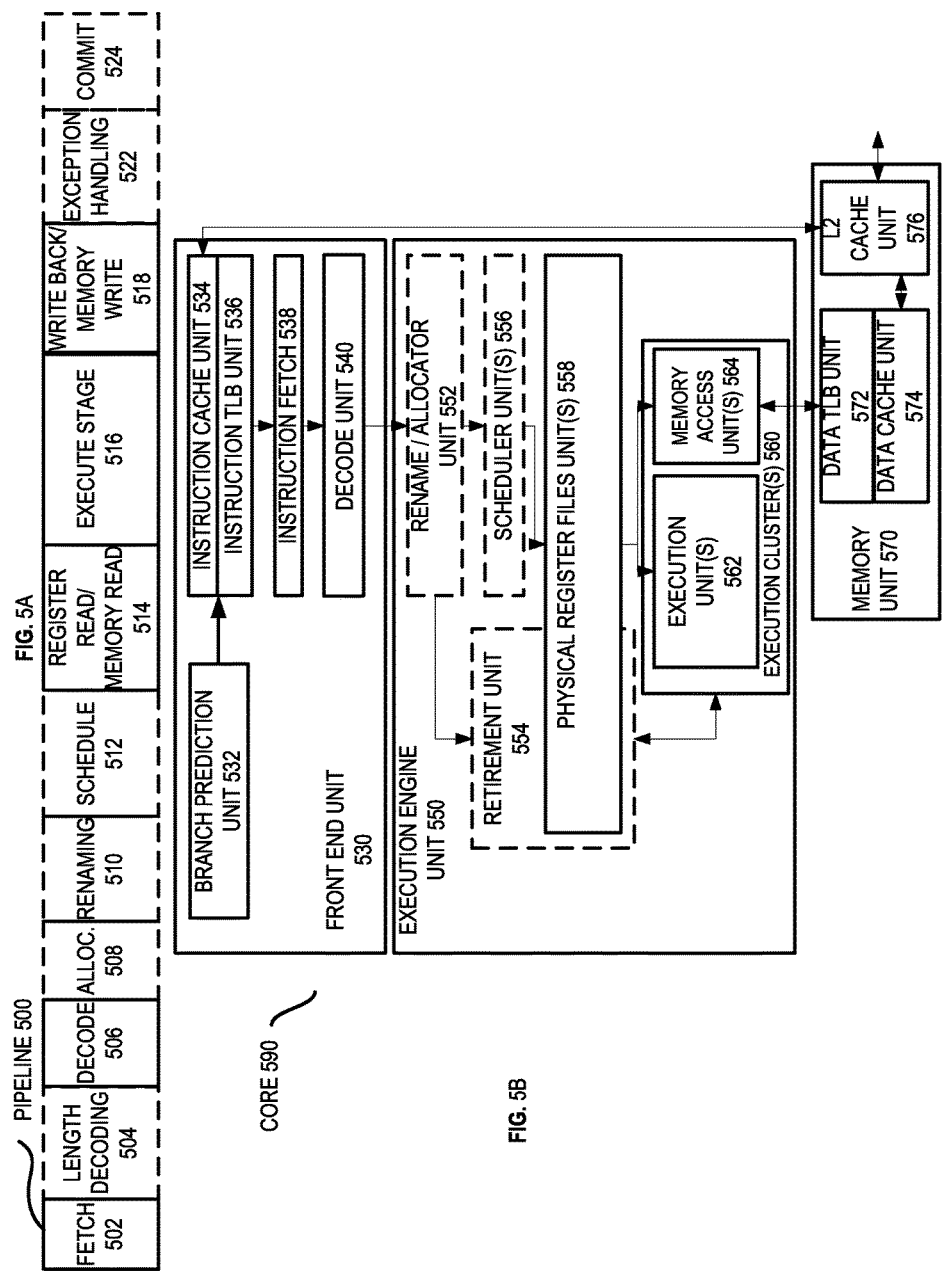

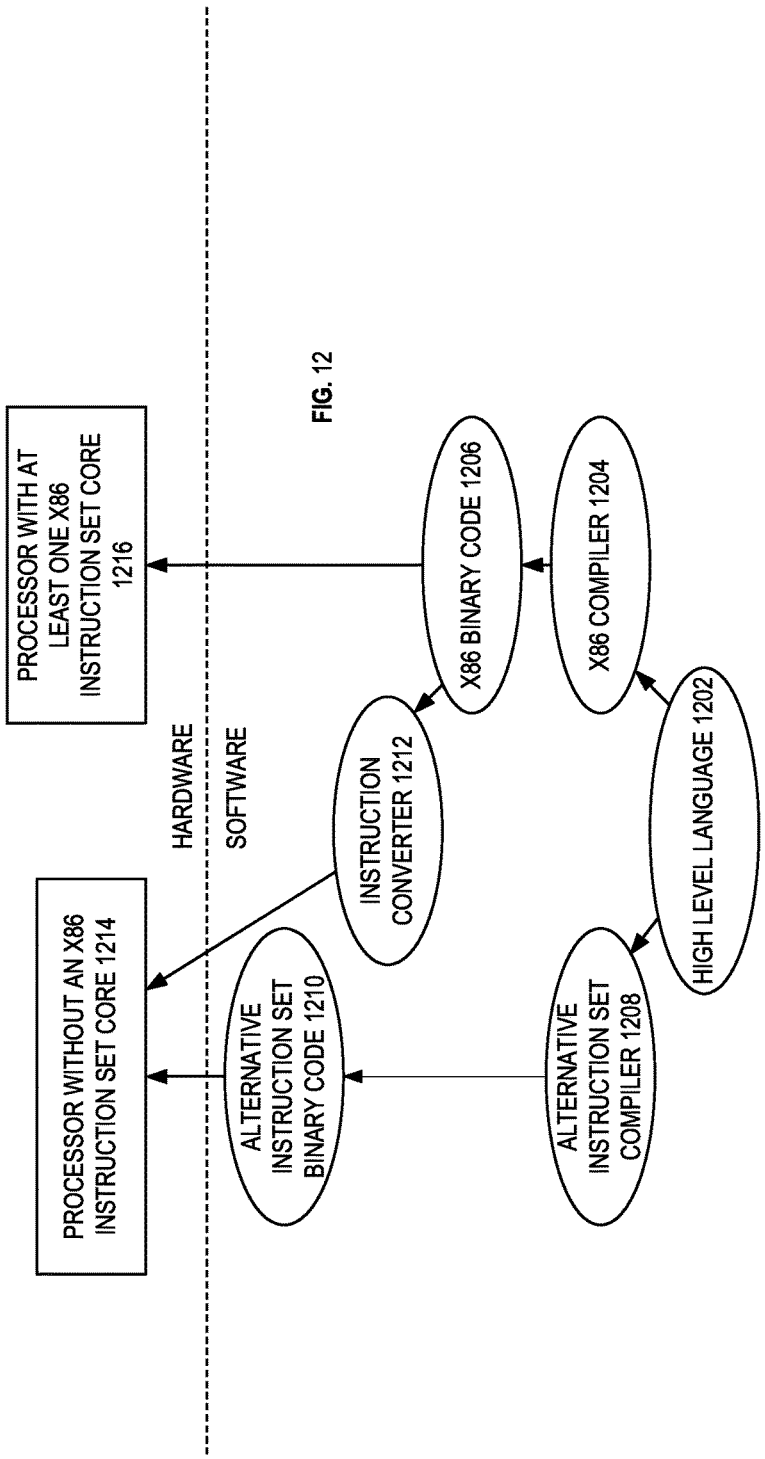

SYSTEMS, APPARATUSES, AND METHODS FOR ENFORCING SECURITY ON A PLATFORM

FIELD OF INVENTION

The field of invention relates generally to computer processor architecture, and, more specifically, to platform security.

BACKGROUND

In enterprise environments, a platform owner typically installs several agent software programs on a platform to help enforce security and manageability policies on the platform when it is running. These agents are responsible for tasks such as running IP scans, port scanning, keeping anti-virus software running/updated, keeping critical remote manageability software running/updated, etc.

Malicious or accidental removal of these agents could make the system vulnerable to network attacks, or it could render critical management functions non-operational. If the agent software is removed in an unauthorized manner the platform owner must be notified of removal so an appropriate defense action could be taken which could range from restarting the agent, other recovery steps or even shutting down the system based on the level of perceived threat.

BRIEF DESCRIPTION OF THE DRAWINGS

The present invention is illustrated by way of example and not limitation in the figures of the accompanying drawings, in which like references indicate similar elements and in which:

FIG. 5A is a block diagram illustrating both an exemplary in-order pipeline and an exemplary register renaming, out-of-order issue/execution pipeline according to embodiments of the invention.

FIG. 5B is a block diagram illustrating both an exemplary embodiment of an in-order architecture core and an exemplary register renaming, out-of-order issue/execution architecture core to be included in a processor according to embodiments of the invention.

FIG. 12 is a block diagram contrasting the use of a software instruction converter to convert binary instructions in a source instruction set to binary instructions in a target instruction set according to embodiments of the invention.

DETAILED DESCRIPTION

Figure 1:
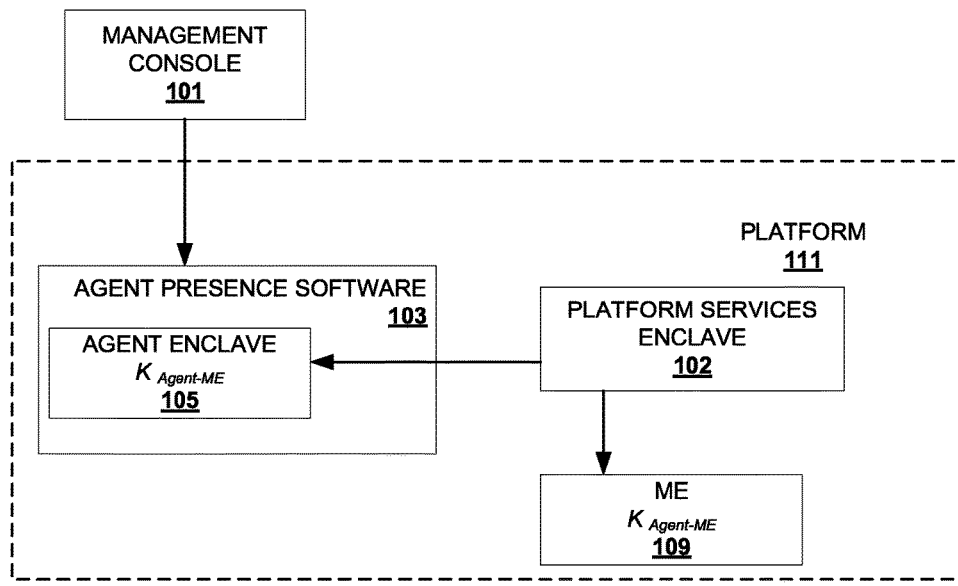
FIG. 1 illustrates an embodiment of an architecture for hardening the identity of agent presence software in a platform using an agent/watchdog approach.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Several terms will be used throughout this description. Secure Enclaves is a set of instructions that provides a safe place for an application to execute code and store data inside in the context of an OS process. An application that executes in this environment is called an enclave. A manageability engine (ME) is an isolated hardware environment. The ME may be a component that runs on a processor core or as a part of the chipset (such as on a peripheral control hub (PHC)). Platform Service Enclave (PSE) is a special enclave that can authenticate itself to an ME. An agent enclave is an agent software enclave (one or more software agents may be in an agent enclave enclave). Agent enclave and agent may be used synonymously throughout the specification. An agent watchdog is a service that can monitor if agent software of an agent enclave is running by providing a mechanism for the agent to register itself and assert its presence at preconfigured intervals. In some embodiments, SE provides a mechanism for enclaves running on the same platform to authenticate each other.

In some embodiments, enclaves are executed from the Enclave Page Cache (EPC). The enclave pages are loaded into EPC by an OS. Whenever a page of an enclave is removed from the EPC, cryptographic protections are used to protect the confidentiality of the enclave and to detect tampering when the enclave is loaded back into the EPC. Inside the EPC, enclave data is protected using access control mechanisms provided by the processor.

Enclave Page Cache (EPC) is where enclave code is executed and protected enclave data is accessed. The EPC is located within the physical address space of a platform but can be accessed only using SE instructions. The EPC may contain pages from many different enclaves and provides access control mechanism to protect the integrity and confidentiality of the pages. The page cache maintains a coherency protocol similar to the one used for coherent physical memory in the platform.

On some platforms the manageability engine (ME) provides a mechanism for a management console to detect if the software agents that are responsible for safeguarding the platform are removed. The management console initially registers each agent with an agent watchdog timer service inside the ME and specifies things such as when the agent must assert its presence (from the boot time), the time frequency of how often it asserts presence to the watchdog, etc. The setup also involves specifying a defense policy that states the action to take if the agent fails to assert itself to the watchdog as per the schedule. This defense policy may be stored anywhere in the platform such as the ME and is preferably in a location that cannot be tampered with. In typical agent/watchdog systems, agents do not have a way to protect their credentials and hence cannot provide a strong identity to the watchdog timer. Consequently, malware can turn off the agent and impersonate it to the watchdog without detection.

Detailed below are embodiments of solutions to this type of agent spoofing that enables strong authentication preventing malware, including rootkits, from tampering with an agent's identity without detection. This in turn will enable strong security and manageability policies on a platform by implementing defense mechanisms such as shutting down or restarting the platform if agent software integrity violation is detected.

FIG. 1 illustrates an embodiment of an architecture for hardening the identity of agent presence software in a platform using an agent/watchdog approach. This architecture includes several components. As shown in FIG. 1, platform 111 may be any type of computer system such as server computer, desktop computer, laptop computer, netbook computer or so forth. The platform includes various hardware and software to operate together to perform requested operations. As seen, the platform hardware includes a processor (not illustrated), which in one embodiment may be a multicore processor including a plurality of processor cores. As will be discussed further below, each core may include code for execution in a hidden environment, where this environment is hidden from other system software such as an OS or VMM.

A management console 101 allows a platform administrator to configure the platform 111 prior to, and after, deployment. As noted above, the management console initially registers each agent (agent enclave) with an agent watchdog timer service inside the ME 109 and specifies things such as when the agent must assert its presence (from the boot time) and the time frequency of how often it assert its presence to the watchdog. To support hardening, the management console 101 sets up an agent presence service 103 including initializing an agent enclave on the platform with a specific session key to be used between the agent enclave 105 and ME 109. Typically, during this setup a secure session is created between an agent enclave 105 of the agent presence service 103 and the ME 109 via a platform services enclave (PSE) 107. However, in alternative embodiments the PSE is not used, but rather a direct agent enclave 105 and ME 109 connection is made. Additionally, in some embodiments, the management console 101 or other entity supplies a session key to both the agent enclave 105 and ME 109.

The key associated with this session ($K_{Agent-ME}$) is sealed to the agent enclave 105 and stored by the ME 109. Accordingly, both the agent enclave 105 and the ME 109 will have access to the same session key and thus messages sent from the agents in the agent enclave 105 can be authenticated by the ME using the common key.

As hinted at above, there are several different ways that the specific session key can be initialized for use in the platform. In some embodiments, the agent enclave 105 negotiates the session key with the ME 109 through the PSE 107. The agent enclave 105 then seals the key to itself.

In other embodiments, an enclave signed by the same independent software vendor (ISV) as the agent enclave 105 negotiates the session key with the ME 109 and seals the key to the policy (the ISV's public key) for the agent enclave 105 to unseal as needed.

Figure 2:
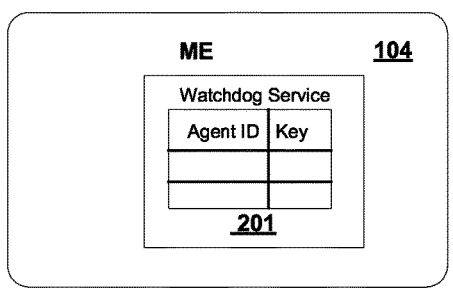
FIG. 2 illustrates an embodiment of the ME in greater detail

There are many approaches to configure the ME 109 to able to identify agent software using agent specific keys. FIG. 2 illustrates an embodiment of the ME 109 in greater detail. In this embodiment, the watchdog service module 201 of the ME 109 stores agent specific keys and authenticates sequence numbers (heartbeat signals) sent by an agent using its specific key. This storage may be in the form of a table that includes a row per heartbeat (by agent ID) and key. The ME 109 can take the key from storage and use it to authenticate protected messages (such as heartbeat message) sent from an enclave as IDed by the agent specific key.

Figure 3:
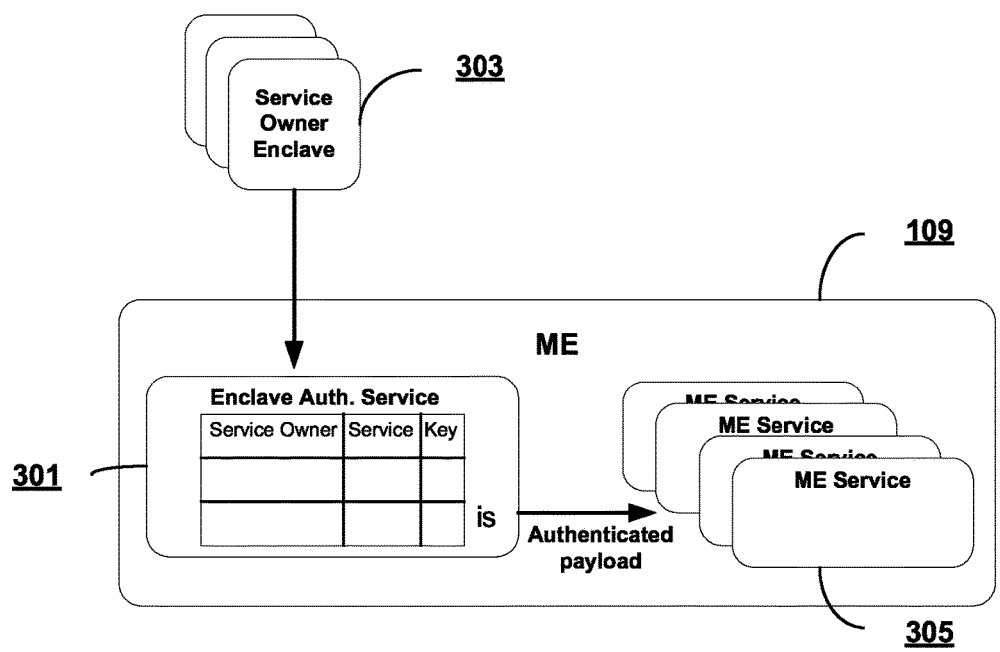
FIG. 3 illustrates another embodiment of the ME in greater detail.

FIG. 3 illustrates another embodiment of the ME 109 in greater detail. In this embodiment, a generic Enclave Authentication Service (EAS) layer 301 is added in ME 109 that maintains a table of ME services, owner (enclave), and key. This EAS layer 301 authenticates the enclave messages from enclaves 301 using agent enclave specific keys before forwarding the payload of the authenticated message down to a service 305 such as a watchdog service (not illustrated, but typically a part of the ME 109). Thus, this layer could be used by ME service modules other than a watchdog as well and it allows an agent to use multiple services from the ME via a universal authentication model.

Figure 4:
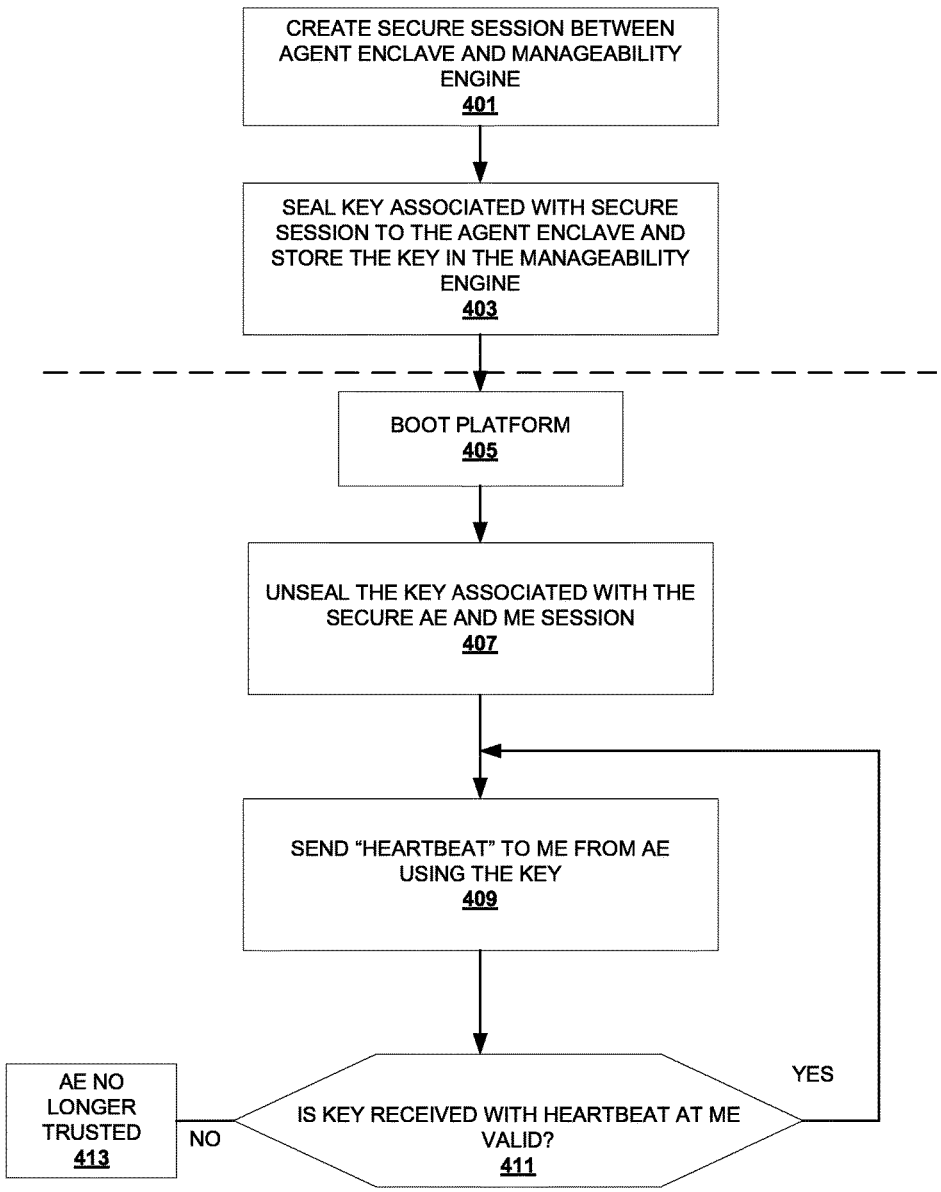
FIG. 4 illustrates an embodiment of method of using secure keys in an agent/watchdog system.

FIG. 4 illustrates an embodiment of method of using secure keys in an agent/watchdog system. At 401, a secure session is created between an agent enclave and a manageability engine of a platform. Typically, this session is created at the direction of a management console, however, this session may also be automatically made upon first boot of a platform. As detailed above, the agent enclave and ME are on the same platform and typically the secure session is created between an agent enclave of the agent presence service and the ME via a platform services enclave (PSE). However, in alternative embodiments the PSE is not used, but rather a direct agent enclave and ME connection is made. The creation of the secure session will produce a key that will be used for secure communication between the enclave and ME. Also, as noted above, this step may not occur and some other mechanism may be used to provision symmetric keys into the agent enclave and ME.

At 403, the key is sealed to the agent enclave and ME stores its copy of the key securely. This key can then be used to send authenticable messages between agents of the enclave and the ME.

The platform boots at some later point in time at 405. When the platform boots, and the agent software starts running, the agent enclave will unseal the KAgent-ME key at 407.

A protected heartbeat (using the unsealed key) is sent from the agent enclave to the ME at 409 for the watchdog to receive (and stop the watchdog from alerting the platform to something being wrong with the agent). Thus, the heartbeat that is sent to the ME will be verifiable as coming from the agent enclave. Of course, other protected messages may also be sent using the key.

A determination of if the received heartbeat (or other message) is authentic is made by the ME at 411. The ME can validate the identity of the agent when it receives the presence assert message using the $K_{Agent-Me}$ stored internally. No other enclave or application can produce that identity as they cannot unseal the session key sealed to the Agent enclave. Depending upon the ME's configuration this determination may occur differently. If the watchdog module has been extended then it will do the authentication. If an EAS has been added to the ME, then it will be used to authenticate the message and pass the payload of the message to the watchdog. If the message is authentic, it is processed and the flow waits for the next message at 409. If the message is not authentic, the agent enclave will be deemed no longer trusted at 413 and an appropriate defense action is taken which could range from restarting the agent, other recovery steps or even shutting down the system based on the level of perceived threat.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Discussed below are diagrams for in-order and out-of-order processors. As noted above, many of the components of these processors could be used to perform one or more aspects of the above methods and those include both the front ends and execution engines of these processors.

FIG. 5A is a block diagram illustrating both an exemplary in-order pipeline and an exemplary register renaming, out-of-order issue/execution pipeline according to embodiments of the invention. FIG. 5B is a block diagram illustrating both an exemplary embodiment of an in-order architecture core and an exemplary register renaming, out-of-order issue/execution architecture core to be included in a processor according to embodiments of the invention. The solid lined boxes in FIGS. 5A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation look aside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 6B:
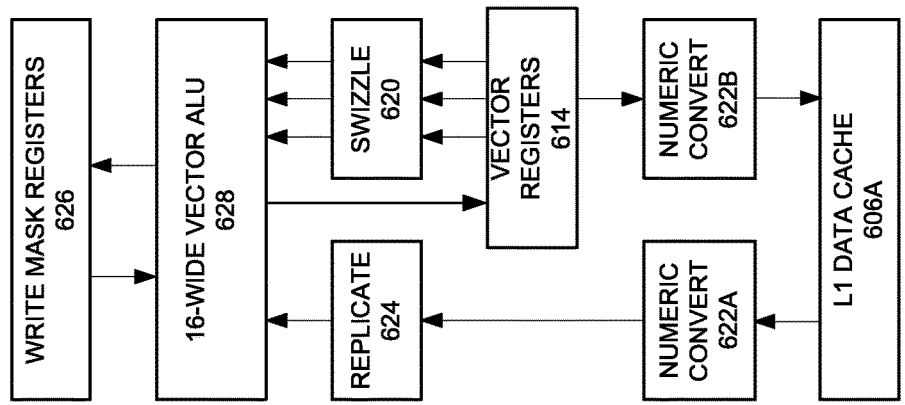
FIGS. 6A-B illustrate a block diagram of a more specific exemplary in-order core architecture, which core would be one of several logic blocks (including other cores of the same type and/or different types) in a chip.
Figure 6A:
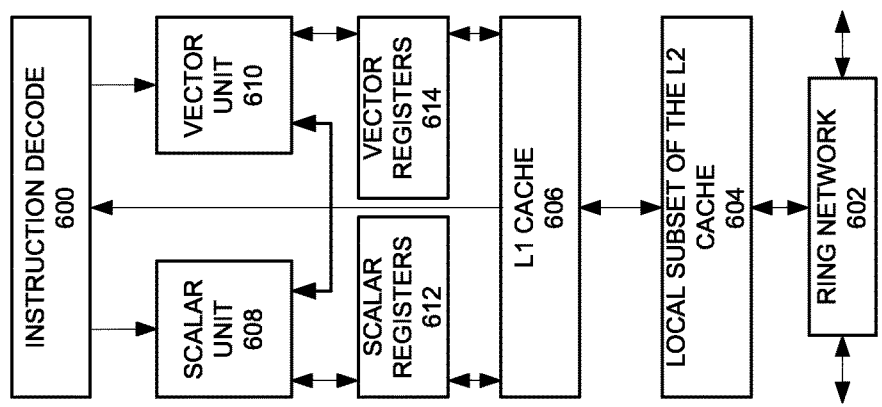

FIGS. 6A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 6A is a block diagram of a single processor core, along with its connection to the on-die interconnect network 602 and with its local subset of the Level 2 (L2) cache 604, according to embodiments of the invention. In one embodiment, an instruction decoder 600 supports the x86 instruction set with a packed data instruction set extension. An L1 cache 606 allows low-latency accesses to cache memory into the scalar and vector units. While in one embodiment (to simplify the design), a scalar unit 608 and a vector unit 610 use separate register sets (respectively, scalar registers 612 and vector registers 614) and data transferred between them is written to memory and then read back in from a level 1 (L1) cache 606, alternative embodiments of the invention may use a different approach (e.g., use a single register set or include a communication path that allow data to be transferred between the two register files without being written and read back).

The local subset of the L2 cache 604 is part of a global L2 cache that is divided into separate local subsets, one per processor core. Each processor core has a direct access path to its own local subset of the L2 cache 604. Data read by a processor core is stored in its L2 cache subset 604 and can be accessed quickly, in parallel with other processor cores accessing their own local L2 cache subsets. Data written by a processor core is stored in its own L2 cache subset 604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 6B is an expanded view of part of the processor core in FIG. 6A according to embodiments of the invention. FIG. 6B includes an L1 data cache 606A part of the L1 cache 604, as well as more detail regarding the vector unit 610 and the vector registers 614. Specifically, the vector unit 610 is a 16-wide vector processing unit (VPU) (see the 16-wide ALU 628), which executes one or more of integer, single-precision float, and double-precision float instructions. The VPU supports swizzling the register inputs with swizzle unit 620, numeric conversion with numeric convert units 622A-B, and replication with replication unit 624 on the memory input.

Processor with Integrated Memory Controller and Graphics

Figure 7:
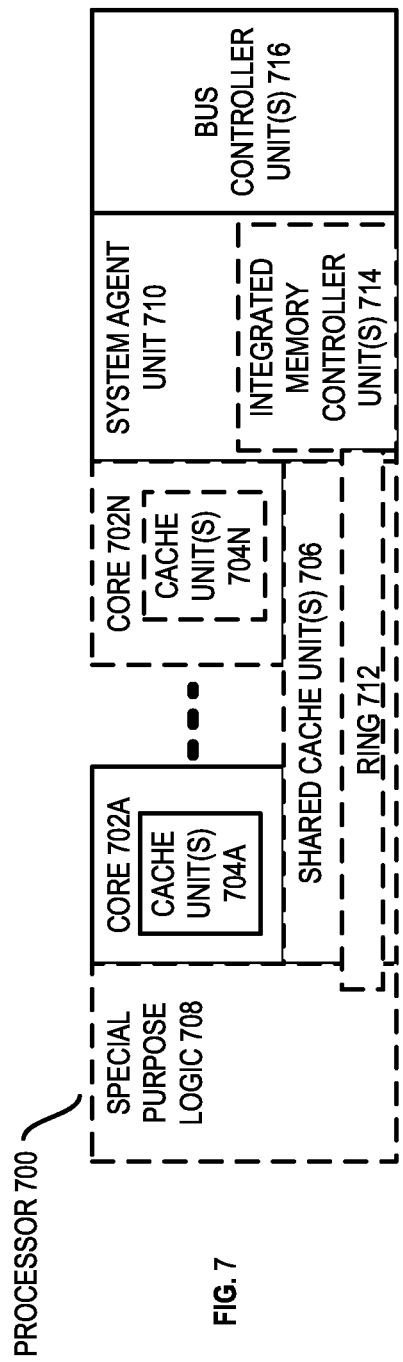
FIG. 7 is a block diagram of a processor 700 that may have more than one core, may have an integrated memory controller, and may have integrated graphics according to embodiments of the invention.

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOSh, CMOS, or NMOS.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multi-threading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Exemplary Computer Architectures

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
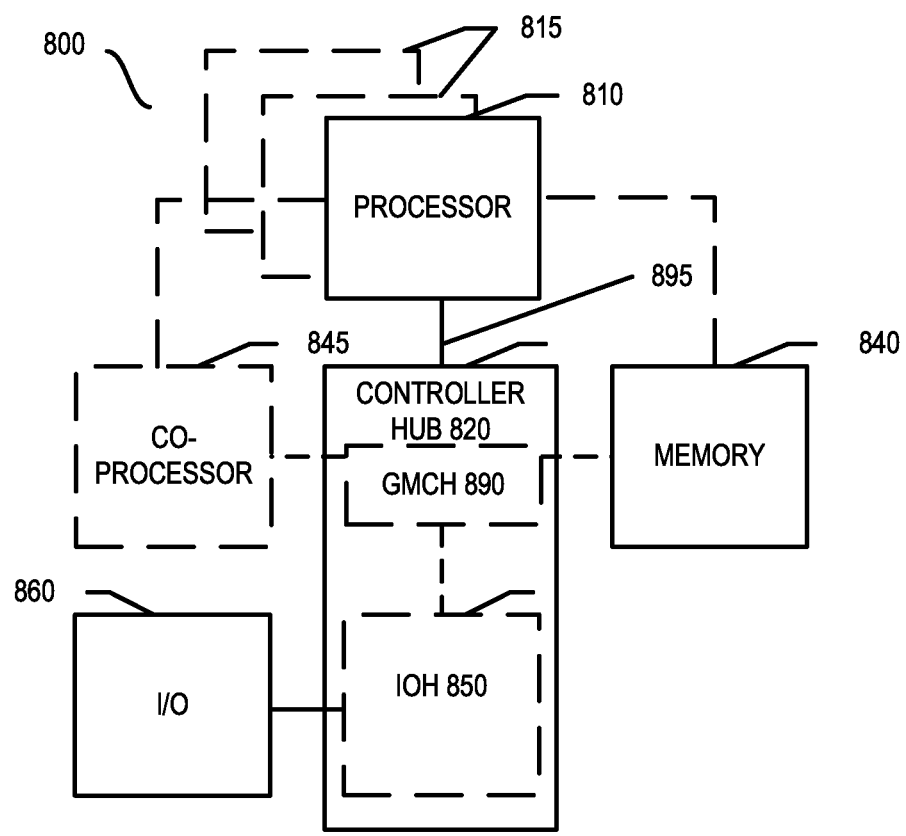
FIGS. 8-11 are block diagrams of exemplary computer architectures.

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
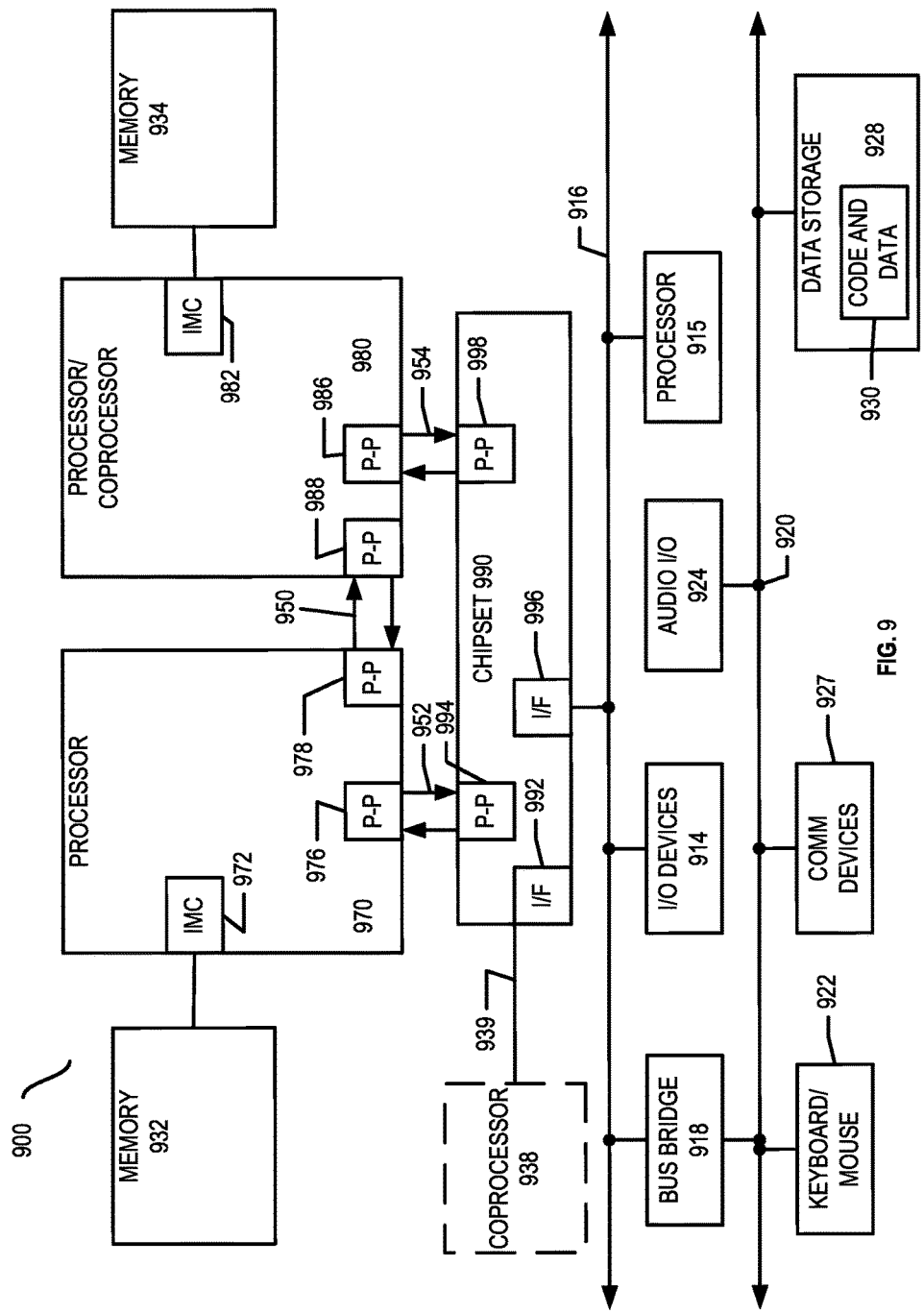

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988.

Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
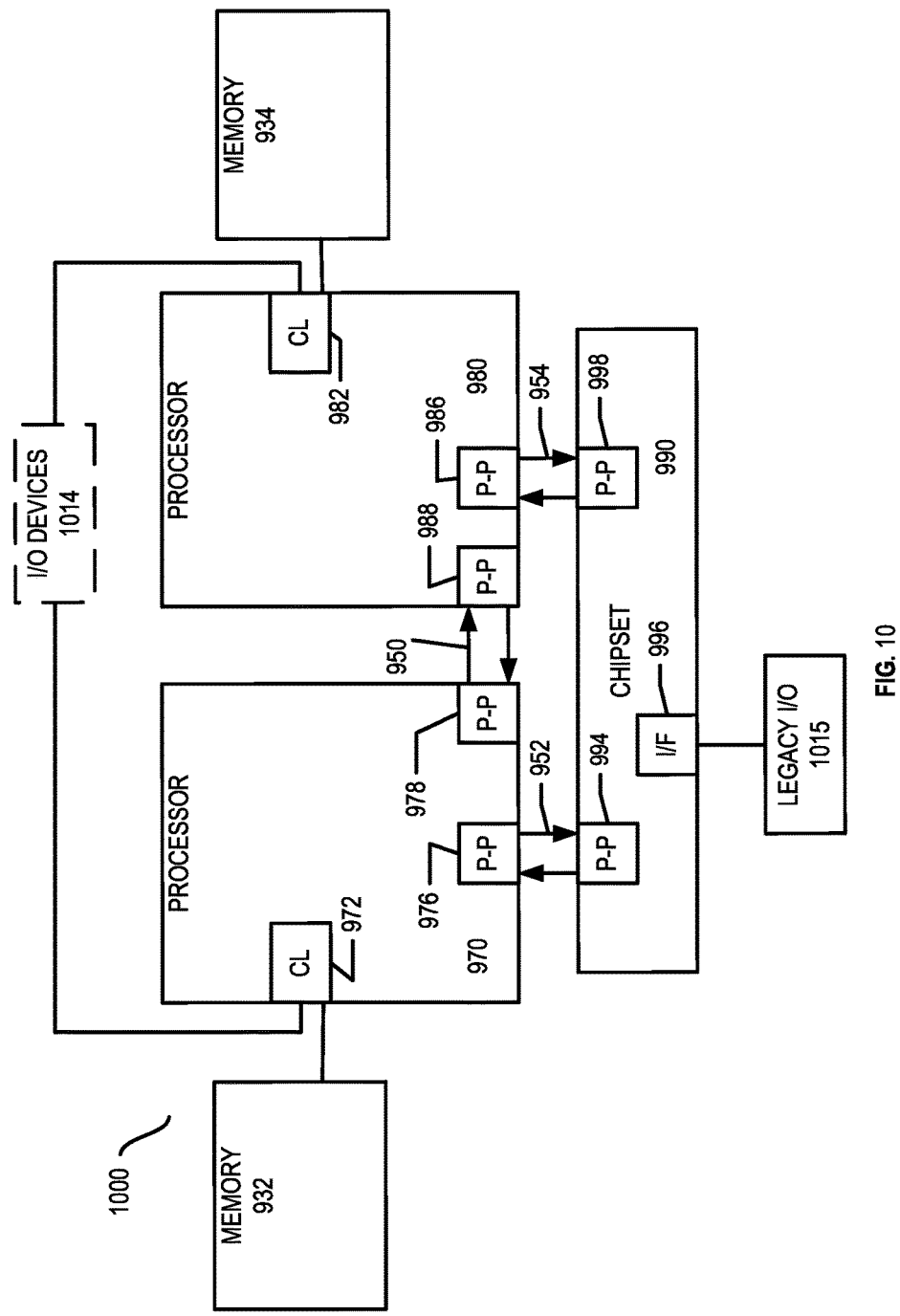

Referring now to FIG. 10, shown is a block diagram of a second more specific exemplary system 1000 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
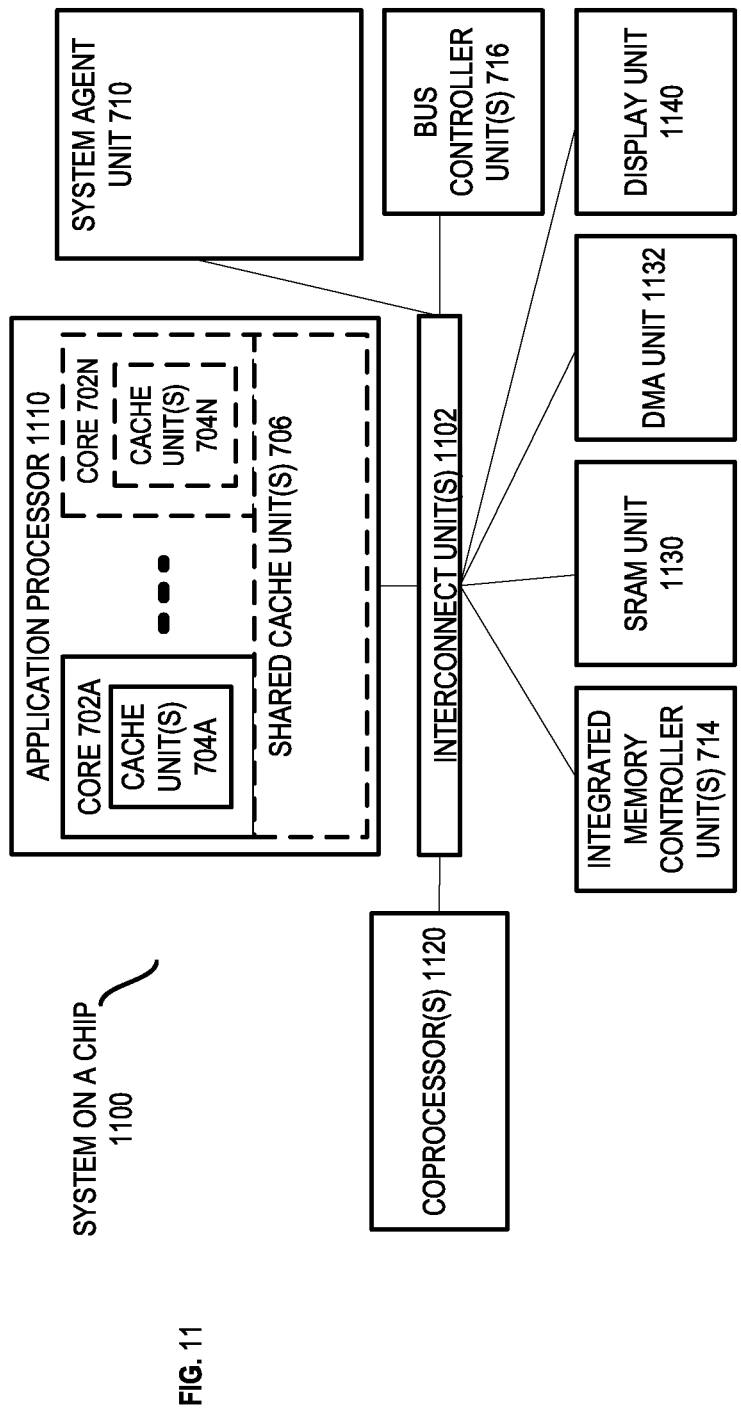

Referring now to FIG. 11, shown is a block diagram of a SoC 1100 in accordance with an embodiment of the present invention. Similar elements in FIG. 7 bear like reference numerals. Also, dashed lined boxes are optional features on more advanced SoCs. In FIG. 11, an interconnect unit(s) 1102 is coupled to: an application processor 1110 which includes a set of one or more cores 202A-N and shared cache unit(s) 706; a system agent unit 710; a bus controller unit(s) 716; an integrated memory controller unit(s) 714; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 12 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

The invention claimed is:

1. A system comprising:
a manageability engine of a computer platform comprising a processor, the manageability engine to detect if a software agent of the computer platform is removed by using a watchdog service that detects if there is a presence of the software agent by detecting the software agent sending a presence message within a certain time period or frequency of sending the presence message, wherein the manageability engine is isolated from the processor of the computer platform; and
a software agent enclave, wherein the software agent enclave and manageability engine each include a specific session key to be used for communications between the software agent enclave and the manageability engine, and wherein the software agent is run in the software agent enclave; wherein the manageability engine includes a service layer to maintain a table of manageability engine services, software agent enclaves, and their corresponding keys and restarts the software agent or shuts down the system if the watchdog service does not detect the presence of the software agent.

2. The system of claim 1, wherein the manageability engine includes the watchdog service to monitor the software agent enclave by providing a mechanism for the software agent enclave to register itself with a watchdog server and assert its presence to the watchdog service at preconfigured intervals.

3. The system of claim 2, further comprising:
a management console to register each software agent enclave with the watchdog service and specify when the software agent enclave must assert its presence (from the boot time) and a schedule of how often each software agent enclave asserts its presence to the watchdog service.

4. The system of claim 3, further comprising:
a defense policy stored in the system that states an action to take if the software agent enclave fails to assert itself to the watchdog service as per the schedule.

5. The system of claim 1, wherein the manageability engine includes a table of specific session keys and their corresponding software agent enclave ID.

6. The system of claim 1, wherein the service layer authenticates the software agent enclaves using software agent enclave specific keys before forwarding the payload of the authenticated message down to the watchdog service or to other manageability engine service that subscribes to the enclave authentication service.

7. A method comprising:
creating a secure session between a software agent enclave and a manageability engine of a computer platform comprising a processor to generate a specific session key, the manageability engine to detect if a software agent of the computer platform is removed by using a watchdog service that detects if there is a presence of the software agent by detecting the software agent sending a heartbeat message within a certain time period or frequency of sending the heartbeat message, wherein the software agent is run in the software agent enclave, and the manageability engine is isolated from the processor of the computer platform;
sealing the specific session key associated with the secure session to the software agent enclave;
storing the specific session key in the manageability engine;
sending the heartbeat message to the manageability engine from the software agent enclave using the specific session key stored in the manageability engine;

determining in the manageability engine if the specific session key used to send the heartbeat message is valid, the specific session key being used to protect the heartbeat message, wherein when the specific session key is not valid the software agent enclave is deemed invalid and when the specific session key is valid then the manageability engine awaits a next heartbeat message; and restarting the software agent or shutting down the computer platform if the manageability engine determines the specific session key is not valid or the watchdog service does not detect the heartbeat message.

8. The method of claim 7, further comprising:

unsealing the specific session key associated with the software agent enclave and the manageability engine.

9. The method of claim 7, wherein when the key is not valid performing one of: restarting the software agent enclave, performing recovery steps, or even shutting down the system.

10. The method of claim 7, further comprising:

booting a platform that contains the software agent enclave and manageability engine.

11. The method of claim 7, wherein the manageability engine includes the watchdog service to watch for the heartbeat messages.

12. The method of claim 7, wherein the manageability engine includes a table of specific session keys and their corresponding software agent enclave ID.

13. The method of claim 7, wherein the manageability engine includes a service layer to maintain a table of manageability engine services, enclave (service owner) IDs, and their corresponding keys.

14. The method of claim 13, wherein the service layer authenticates the software agent enclaves using software agent enclave specific keys before forwarding the payload of the authenticated message down to the watchdog service or to other manageability engine service that subscribes to the enclave authentication service.

* * * * *